Sept. 25, 1962 V. F. WIGAL 3,055,123
GLOBE
Filed April 24, 1961 3 Sheets-Sheet 1

INVENTOR.
V. FREDERICK WIGAL
BY Ralph N. Kalish
ATTORNEY

Sept. 25, 1962 V. F. WIGAL 3,055,123
GLOBE
Filed April 24, 1961 3 Sheets-Sheet 2

INVENTOR.
V. FREDERICK WIGAL
BY Ralph W. Kalish

ATTORNEY

Sept. 25, 1962 V. F. WIGAL 3,055,123
GLOBE
Filed April 24, 1961 3 Sheets-Sheet 3
FIG. 10
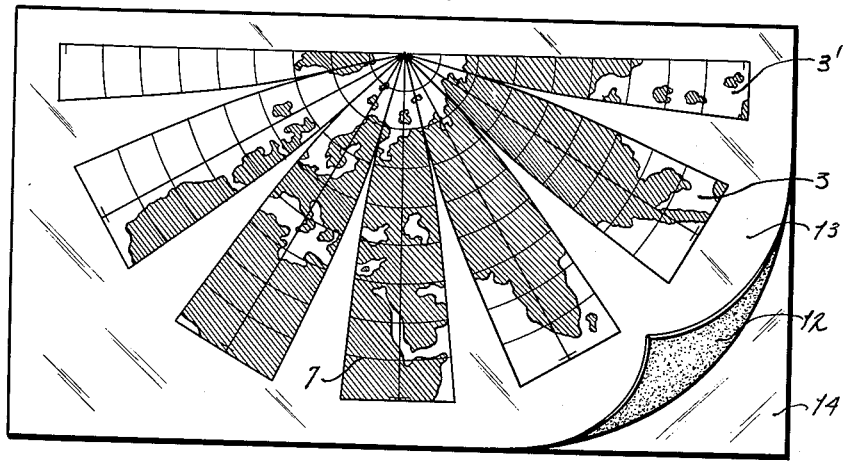
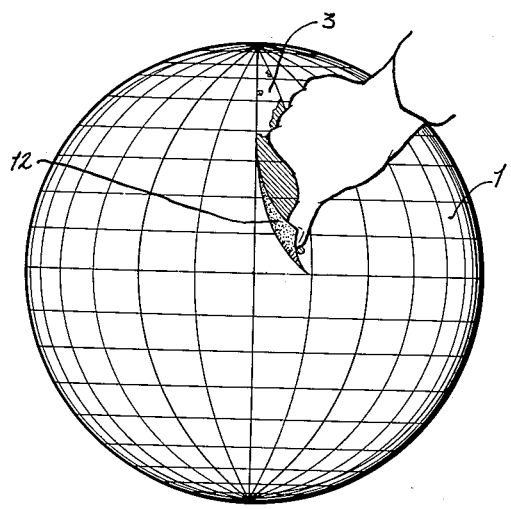
FIG. 11
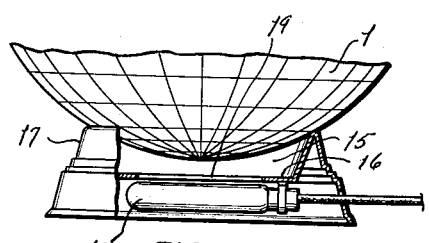
FIG. 12
INVENTOR.
V. FREDERICK WIGAL
BY
ATTORNEY 3,055,123
GLOBE
Vorhis Frederick Wigal, Jackson, Tenn., assignor to Tigrett Industries, Inc., Jackson, Tenn., a corporation of Delaware
Filed Apr. 24, 1961, Ser. No. 104,871
6 Claims. (Cl. 35—46)

This invention relates in general to educational devices and, more particularly, to a globe comprised of easily assembled components.

It is a primary object of the present invention to provide a globe comprised of uniquely inter-related constituent elements which are adapted for ready assembly into a fully formed unit by unskilled individuals, such as, particularly, children, whereby said globe may be presented in "knocked down" condition for substantial economy in production and in commercial handling.

It is a further object of the present invention to provide a globe of the character stated which in the assembly of its components serves both to conduce to development of the manual dexterity of the user as well as to provide enhanced geographical instruction to the user by virtue of perception gained through the manipulative efforts requisite for assembly.

It is an additional object of the present invention to provide a globe of the character stated which may be most economically manufactured; which comprises component elements of simple construction; which globe when fully assembled is durable and stable, being resistant to breakdown through the normal, expected hard usage on the part of young users; and which by reason of its novel construction provides an educational device economically within range of users of most modest financial means.

Other objects and details of the invention will be apparent from the following description, when read in connection with the accompanying drawings (three sheets) wherein—

FIGURE 10 is a plan view of map gores prior to severance for ultimate affixation upon the globe shell.

FIGURE 11 illustrates the application of a map gore upon the globe shell.

FIGURE 12 is a fragmentary view in partial section illustrating an illuminated mounting for the globe.

Figure 1:
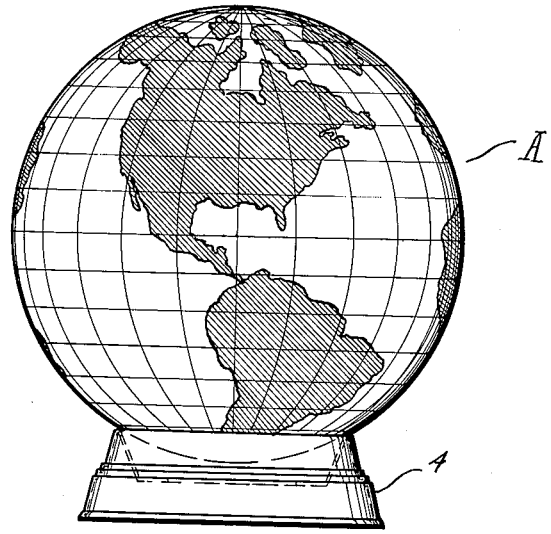
FIGURE 1 is a side elevational view of a fully assembled globe constructed in accordance with and embodying the present invention.
Figure 2:
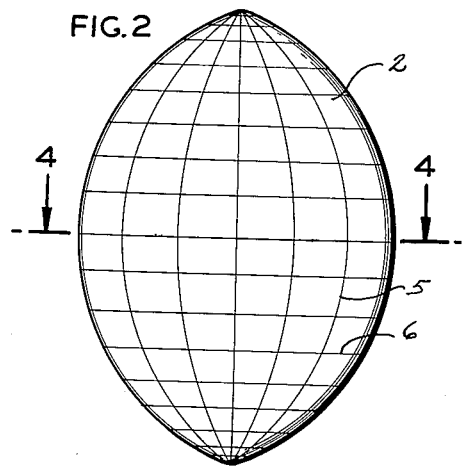
FIGURE 2 is an outer or front elevational view of a component section of the globe shell.
Figure 3:
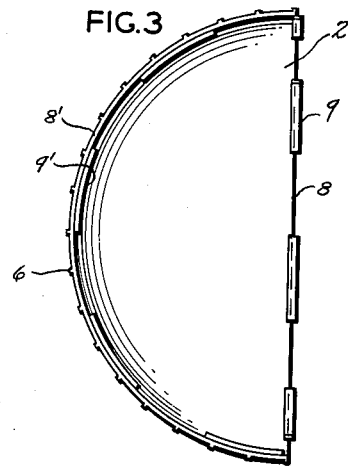
FIGURE 3 is an inner side elevational view of the section shown in FIGURE 2.
Figure 4:
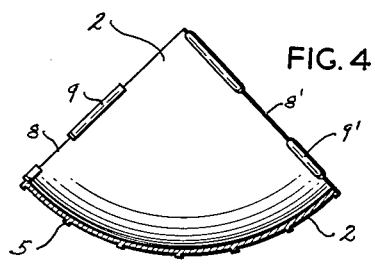
FIGURE 4 is a horizontal transverse section taken on the line 4—4 of FIGURE 2.

Referring now by reference characters to the accompanying drawings, A designates broadly a globe shown, for explanatory purposes only, as being of terrestrial character, which is comprised essentially of a spherical shell 1 composed of a predetermined number of parti-spherical component sections 2, and a plurality of map gores 3 suitably secured upon said shell 1; there being provided a globe mounting 4 which may be of the cradle type. As will be developed more fully hereinbelow, globe A is uniquely constituted of various cooperating elements rendering the same amenable to presentation to the average, mechanically unskilled user in so-called "knockdown" state for ultimate, facile assembly by such user to form a cartographically accurate globe for educational reference.

Component sections 2 are shown herein, for descriptive purposes only, as being quadrants, but it must be observed that said sections may be of any preselected arcuate extent or, if desired, the same could even be of varying extents subject only to providing a sphere upon assembly. Said sections 2 are preferably formed of molded, rigid plastic, such as, for example, Plexiglas [1]; and being of opaque or translucent material depending upon whether interior illumination of globe A is to be effected. Integrally formed on the outer surface of each section 2 are longitude- and latitude-defining ridges 5, 6, respectively, with the former being presented at 15° intervals and the latter at 10° spacings. Ridges 5, 6 are quite shallow, being raised above the section surface in the order of .0025 inch and serve to define guides for ready location of gores 3 during the globe-forming operation (see FIGURE 11). The number of ridges 5, 6 is dependent upon choice alone, although the same should correspond with map gores 3 whereby the spherical angle of said gores is the same as that defined by two adjacent longitude ridges 5 for ease of assembly and whereby further, the ridges 6 will be spaced apart to the same extent as the latitude lines 7 printed or otherwise delineated on each map gore 3. With finally assembled globe A the longitude and latitude lines may slightly protrude by reason of the limited elevation of ridges 5, 6 to facilitate manipulation of globe A and to enhance the ready determination of any specific geographical point sought.

The opposed side edges 8, 8' of each section 2 constitute abutments for respective surfacewise engagement with the confronting edges of adjacent sections 2 for completing globe shell 1; and by such face-to-face contact conduce to the horizontal stability of shell 1 rendering same resistant to accidental disassembly by horizontal tangential forces.

Figure 8:
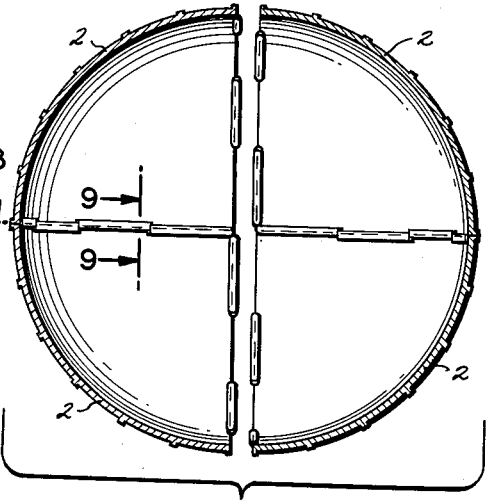
FIGURE 8 is a horizontal transverse sectional view taken on the line 8—8 of FIGURE 7.
Figure 9:
FIGURE 9 is a fragmentary vertical transverse sectional view taken on the line 9—9 of FIGURE 8.

Provided adjacent each side edge 8,8' of each section 2, on the inner surface thereof, for extension outwardly beyond the related edge is a plurality of spaced-apart, elongated, flat lips 9, 9', respectively, separated by intervening spaces 10, 10' respectively; said lips 9, 9' and spaces 10, 10' being of like extent. As may be more easily seen in FIGURES 5, 6, 7, and 8, lips 9, 9' on each section are offset with respect to each other so that during globe shell formation, lips 9' on edge 8' of one section 2 may be snugly received within spacings 10 on the cooperating adjacent section, and lips 9 on said latter edge will fit between the proximate lips 9', within spacings 10', on the said companion section 2. Thus, lips 9, 9' will in their extended portions overlie the inner surface of the cooperating section (FIGURE 8) whereby said lips 9, 9' will form a substantially unbroken, continuous meridianly extending rib or line of support. It is to be especially noted that the adjacent end faces of said lips are in substantial abutment to thereby resist vertical tangential forces and to contribute to the stability of shell 1. Also, through the aforesaid overlap, the meeting edges of adjacent sections 2 are further reinforced (see FIGURE 9).

---
[1] Plexiglas is a trademark of Rohm & Haas Co. for methyl methacrylate.

Figure 5:
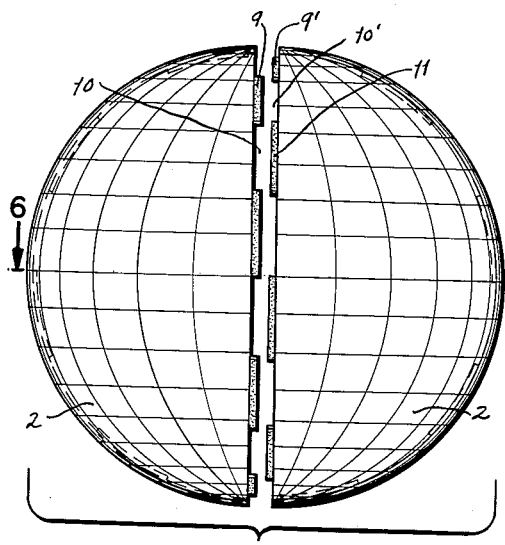
FIGURE 5 is an outer side elevational view of two globe shell sections relatively positioned preparatory to joining for shell formation.
Figure 6:
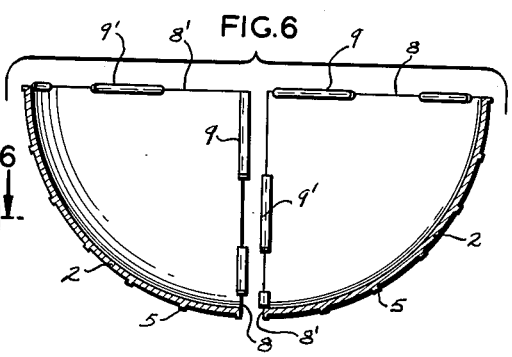
FIGURE 6 is a horizontal transverse sectional view taken on the line 6—6 of FIGURE 5.
Figure 7:
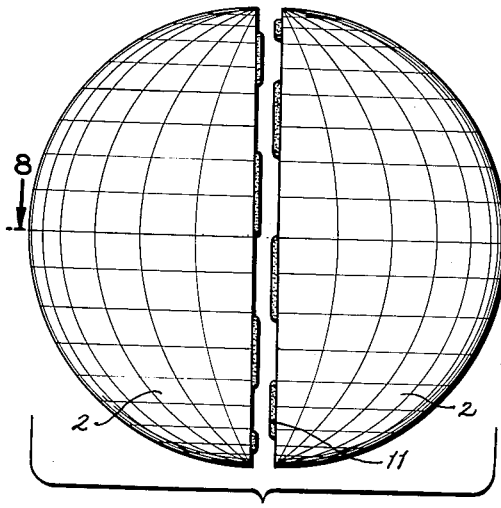
FIGURE 7 is an outer side elevational view of two hemispherical shell units, each comprised of a pair of joined sections shown in FIGURE 6, illustrating said units preparatory to uniting for completion of the globe shell formation.

By this unique coaction between adjacent sections 2, the same may be readily assembled to form globe shell 1 with the sequential steps therefor being shown in FIGURES 5 and 7. Referring to the former, it will be seen that two such sections, quadrants in this instance, are disposed in proper alignment and thereon are brought together with interfit of lips 9, 9' within spacings 10, 10' as above set forth. Although sections 2 may be united solely through the interfitting, mechanical means described, it has been found that an application of a hard setting adhesive 11, such as, an epoxy resin, upon the outwardly directed faces of lips 9, 9' for securing same to the inner surface of the confronting section, augments the sectional union. The other two quadrant sections are then similarly connected, and the resulting hemispheres, as shown in FIGURE 7, are next aligned and then interengaged in the same manner as any constituent quadrant sections. It is apparent that globe shell 1 may be built up by adding one section after another successively, but for facility of handling and for assuring proper alignment, the desirable procedure is to make multi-sectional units, such as, hemispheres, and then join same in the final shell assembly operation.

After globe shell 1 is completed, the same is then covered by map gores 3. Said gores 3 are printed upon thin, relatively elastic material, such as, a suitable vinyl plastic, and are provided on their rearward surface with a pressure sensitive adhesive coating, as at 12. Map gores 3 are preferably of general wedge shape so as to cover a portion of the globe equal to 15 degrees of longitude and 90 degrees of latitude whereby the thinner end may be secured at the particular pole and the other, wider end upon the equator; it being recognized that ridges 5 are utilized for guide purposes. Obviously, map gores 3 may be of any desired width, more or less than 15 degrees of longitude, as indicated at 3' in FIGURE 10. The inherent elasticity of map gores 3 is a primary characteristic, as it assures of snug, close-fitting conformity of the same to the curvature of globe shell 1 without the development of an unsightly wrinkled surface. Map gores 3 may be precut, but the provision of a group of same upon a single sheet, as 13, permits economy of manufacture and provides cutting objects for the user who may sever the gores from sheet 13 by cutting along the margins thereof. A suitable backing sheet 14, of non-adhering nature, will be used to protect adhesive 12 prior to application of map gores 3 on globe shell 1. The material of construction of sheet 13 may be optionally translucent or opaque.

After map gores 3 have been affixed upon shell 1 to complete assembly of globe A, the latter may then be seated within the cradle type mounting which incorporates an upwardly opening recess 15 defined by a base wall 16 and an annular side wall 17, the upper edge of the latter being in engagement with globe A along an annular line of contact for universal positioning of said globe during examination and study. As shown in FIGURE 12, mounting 4 may be provided with an illuminating device 18, connected to a remote source of power and being disposed below base wall 16; there being an opening 19 in said base wall 16 for passage therethrough of light rays emanating from illuminating device 18 to thereby give the effect of interior lighting to globe A if the latter is formed of translucent materials.

Although gores 3 have been shown herein as carrying portions of a terrestrial map, it is quite apparent that the present invention may be used as a celestial globe without departing from the nature and spirit of the invention herein.

From the foregoing, it will thus be seen that globe A is comprised of unique, inter-related components which may be cheaply manufactured and which are designed for ready and accurate assembly to provide a globe which is highly durable and attractive.

It should be understood that changes and modifications in the formation, construction, arrangement, and combination of the several parts of the globe may be made and substituted for those herein shown and described without departing from the nature and principle of my invention.

Having thus described my invention, what I claim and desire to secure by Letters Patent is:

1. A globe comprising a shell constituted of a plurality of discrete, inter-related segmental elements, each element having a pair of side edges for surfacewise abutment with the side edges of the adjacent elements, a plurality of spaced-apart lip members provided on each element for extension beyond each side edge thereof, the lip members on one side edge being offset with respect to the lip members on the opposite side edge, said lip members on each such side edge being spaced apart a distance equal to their length, and a plurality of chart-completing cartographic sections secured coveringly upon the exterior face of said globe, each such section being relatively thin, and elastic for snug conformity to the curvature of the globe.

2. A globe comprising a plurality of discrete parti-spherical elements formed of molded material, means provided on each element for interengaging same with adjacent elements for globe formation, there being longitude- and latitude-defining ridges formed on each element and protruding from the outer surface thereof, and a plurality of relatively thin, elastic cartographic sections secured coveringly and conformingly upon the exterior of said interengaged elements, said sections having delineated thereon latitude and longitude lines for immediate overlying correspondence with the said ridges.

3. A globe comprising a shell constituted of a plurality of discrete, inter-related segmental elements having chords equal to the diameter of the shell, said elements being formed of molded, rigid material, the side edge faces of said elements being in abutment with the side edge faces of the adjacent elements, a plurality of spaced-apart lip members integrally provided on the inner face of each element for extension laterally beyond each side edge thereof, the lip members projecting from one side edge being offset with respect to the lip members projecting from the opposite side edge, said lip members projecting from each such side edge being spaced apart a distance equal to their length, a plurality of relatively thin, elastic cartographic sections, and adhesive means for securing said cartographic sections upon the exterior of said interengaged elements in covering, snugly conforming manner thereon.

4. A globe as defined in claim 3 and further characterized by latitude- and longitude-defining ridges being formed on the exterior on said segmental elements and supporting said elastic cartographic sections.

5. A globe as defined in claim 3 and further characterized by said globe having a pair of pole portions, by said cartographic sections being of general wedge contour for covering an area of said globe between one pole portion and a point intermediate said pole portions.

6. A globe as defined in claim 4 and further characterized by said cartographic sections being shaped for extension between a pair of adjacent longitude-defining ridges.

References Cited in the file of this patent

UNITED STATES PATENTS

| | | |
|---|---|---|
| 1,808,354 | King | June 2, 1931 |
| 2,228,736 | Starworth | Jan. 14, 1941 |
| 2,354,381 | Kennedy | July 25, 1944 |
| 2,510,215 | Pityo et al. | June 6, 1950 |